(12) United States Patent
Shibahara et al.

(10) Patent No.: US 11,270,001 B2
(45) Date of Patent: Mar. 8, 2022

(54) CLASSIFICATION APPARATUS, CLASSIFICATION METHOD, AND CLASSIFICATION PROGRAM

(71) Applicant: NIPPON TELEGRAPH AND TELEPHONE CORPORATION, Tokyo (JP)

(72) Inventors: Toshiki Shibahara, Tokyo (JP); Takeshi Yagi, Tokyo (JP); Mitsuaki Akiyama, Tokyo (JP); Yuta Takata, Tokyo (JP); Daiki Chiba, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 492 days.

(21) Appl. No.: 16/322,972

(22) PCT Filed: Aug. 7, 2017

(86) PCT No.: PCT/JP2017/028596
§ 371 (c)(1),
(2) Date: Feb. 4, 2019

(87) PCT Pub. No.: WO2018/066221
PCT Pub. Date: Apr. 12, 2018

(65) Prior Publication Data
US 2019/0180032 A1  Jun. 13, 2019

(30) Foreign Application Priority Data
Oct. 3, 2016 (JP) .............................. JP2016-196019

(51) Int. Cl.
*G06F 16/00* (2019.01)
*G06F 21/56* (2013.01)
*G06F 21/55* (2013.01)
(Continued)

(52) U.S. Cl.
CPC ............ *G06F 21/567* (2013.01); *G06F 16/00* (2019.01); *G06F 16/906* (2019.01);
(Continued)

(58) Field of Classification Search
CPC ...... G06F 16/35; G06F 16/285; G06F 21/567; G06F 16/00; G06F 21/55; G06F 16/906;
(Continued)

(56) References Cited

U.S. PATENT DOCUMENTS

| 8,286,239 | B1 * | 10/2012 | Sutton | H04L 63/1416 |
| | | | | 726/22 |
| 10,230,744 | B1 * | 3/2019 | Pandey | H04L 63/1425 |
| 10,924,503 | B1 * | 2/2021 | Pereira | H04L 63/0236 |
| 10,970,188 | B1 * | 4/2021 | Åvist | H04L 63/1441 |
| 2004/0143663 | A1 * | 7/2004 | Leedom | H04L 47/805 |
| | | | | 709/226 |

(Continued)

OTHER PUBLICATIONS

Extended European Search Report dated Nov. 22, 2019, issued in corresponding European Application No. 17858061.9, 8 pages.
(Continued)

*Primary Examiner* — Noosha Arjomandi
(74) *Attorney, Agent, or Firm* — Xsensus LLP

(57) ABSTRACT

A classification apparatus that classifies sequential data, in which input communication destinations in a plurality of communications are recorded in order of occurrence of the communications, into a class that has a similar feature. There is a numerical vector calculation unit-configured to calculate numerical vectors that represent characteristics of communication destinations for each of the communication destinations, on the basis of sequential data in which the communication destinations in a plurality of communications are recorded in order of occurrence of the communications, and a classification unit-configured to classify the sequential data into a class that has a similar feature, on the basis of order (Continued)

relation of the communication destinations of the numerical vectors.

6 Claims, 13 Drawing Sheets

(51) Int. Cl.
  *G06F 16/906* (2019.01)
  *G06F 16/955* (2019.01)
(52) U.S. Cl.
  CPC ............ *G06F 16/955* (2019.01); *G06F 21/55* (2013.01); *G06F 2221/034* (2013.01)
(58) Field of Classification Search
  CPC ............. G06F 16/955; G06F 2221/034; G06F 21/552
  See application file for complete search history.

(56) References Cited

U.S. PATENT DOCUMENTS

| | | | |
|---|---|---|---|
| 2011/0185428 A1* | 7/2011 | Sallam | H04L 63/145 726/24 |
| 2012/0174224 A1* | 7/2012 | Thomas | G06F 21/566 726/24 |
| 2014/0344927 A1* | 11/2014 | Turgeman | G06F 21/554 726/22 |
| 2015/0310196 A1* | 10/2015 | Turgeman | G06F 3/04842 726/19 |
| 2016/0021126 A1* | 1/2016 | Vasseur | H04L 63/1458 726/23 |
| 2016/0044054 A1* | 2/2016 | Stiansen | H04L 63/1416 726/24 |
| 2016/0337387 A1* | 11/2016 | Hu | G06F 16/2246 |
| 2016/0344758 A1* | 11/2016 | Cohen | G08B 21/18 |
| 2017/0054702 A1* | 2/2017 | Turgeman | G06F 3/04883 |
| 2017/0149808 A1* | 5/2017 | Hamada | H04L 63/0209 |
| 2017/0195353 A1* | 7/2017 | Taylor | G06F 12/0813 |
| 2017/0214708 A1* | 7/2017 | Gukal | G06F 16/285 |
| 2018/0124083 A1* | 5/2018 | Uchiyama | H04L 41/069 |
| 2019/0132344 A1* | 5/2019 | Lem | G06N 5/003 |
| 2019/0297092 A1* | 9/2019 | Shibahara | H04L 63/168 |

OTHER PUBLICATIONS

Naomi et al., "Detection of vulnerability scanning using features of collective accesses based on information collected from multiple honeypots", NOMS 2016—2016 IEEE/IFIP Network Operations and Management Symposium, IEEE, Apr. 25, 2016, pp. 1067-1072, XP032918254.

Akiyama et al., "Design and Implementation of High Interaction Client Honeypot for Drive-by-Download Attacks", IEICE transactions communications, vol. E93-B, No. 5, May 2010, pp. 1131-1139.

Nazario, "PhoneyC: A Virtual Client Honeypot", Apr. 1, 2009, pp. 1-8.

Curtsinger et al., "Zozzle: Fast and Precise In-Browser JavaScript Malware Detection", 16 pages.

Zhang et al., "Arrow: Generating Signatures to Detect Drive-By Downloads", In Proceedings of the 20th international conference on World wide web, Mar. 28-Apr. 1, 2011, pp. 187-196.

Taylor et al., "Cache, Trigger, Impersonate: Enabling Context-Sensitive Honeyclient Analysis On-the-Wire", Internet Society, ISBN 1-8918562-41-X, 2016, pp. 1-15.

Antonakakis et al., "Building a Dynamic Reputation System for DNS", 17 Pages.

Ma et al., "Beyond Blacklists: Learning to Detect Malicious Web Sites from Suspicious URLs", Jun. 28-Jul. 1, 2009, Paris, France, pp. 1245-1253.

Kuze et al., "Detection of Vulnerability Scanning Using Features of Collective Accesses Collected from Several Honeypots", IEICE Technical Report, Feb. 25, 2016, vol. 115, No. 488, 8 pages.

Shindo et al., "Detection of Drive-by Download Attacks Based on File Type Transition in Malware Infection Process", Computer Security Symposium, Oct. 22-24, 2014, 10 pages.

Adachi et al., "Early Detective Method of Remote Access Trojan by Host Base", Computer Security Symposium, Oct. 21-23, 2015, 10 pages.

Hatada et al., "Evaluation of Clustering Analysis Based on Malware Traffic Model", IEICE Technical Report, Jul. 7, 2016, vol. 116, No. 132, 8 pages.

Matsumoto et al., "Visualization System for Drive-by-Download Traffic", Computer Security Symposium 2014, Oct. 22-24, 2014, 10 pages.

International Search Report dated Sep. 12, 2017 for PCT/JP2017/028596 filed on Aug. 7, 2017, 8 pages including English translation.

* cited by examiner

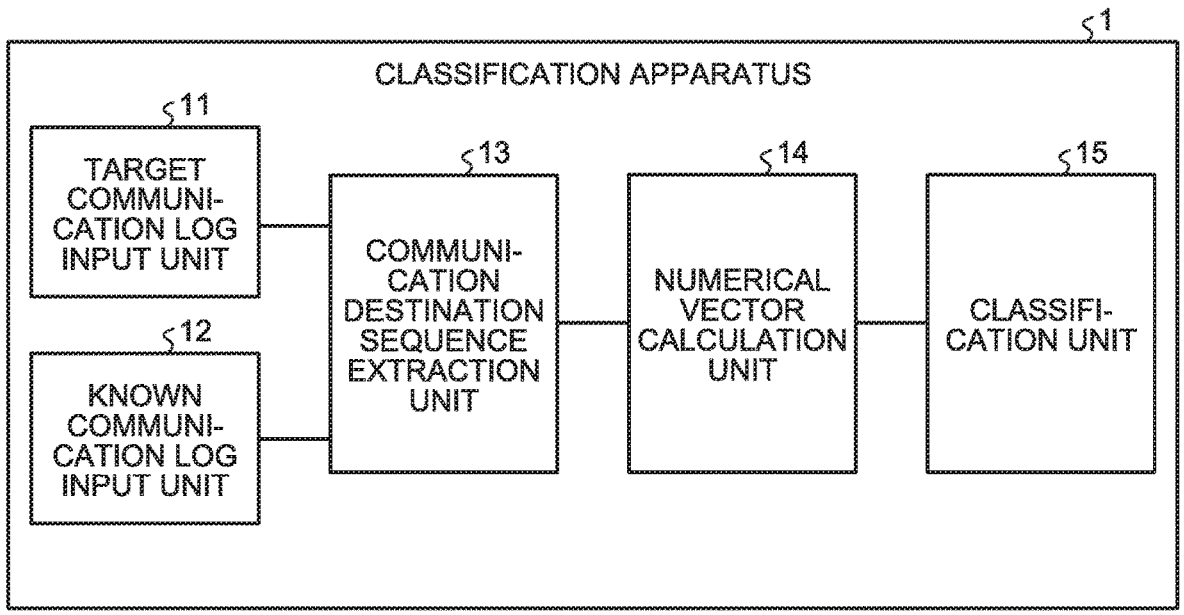

FIG.3

| SERIAL NUMBER | LABEL | COMMUNICATION DESTINATION |
|---|---|---|
| 1 | MALICIOUS | mal1.example/index.html |
| | | mal1.example/script.js |
| | | mal2.example/redirect.php |
| | | mal3.example/exploit.html |
| | | mal3.example/malware.exe |
| 2 | BENIGN | benign.example/index.html |
| | | benign.example/script.js |
| | | benign.example/image.jpg |
| ... | ... | ... |

| SERIAL NUMBER | COMMUNICATION DESTINATION |
|---|---|
| 1 | a.example/index.html |
| | a.example/script.js |
| | b.example/redirect.php |
| | c.example/exploit.html |
| | c.example/malware.exe |
| | d.example/index.html |
| | d.example/script.js |
| | d.example/image.jpg |

(b)

| SERIAL NUMBER | COMMUNICATION DESTINATION |
|---|---|
| 1 | a.example/index.html |
| | a.example/script.js |
| | b.example/redirect.php |
| | c.example/exploit.html |
| | c.example/malware.exe |
| 2 | a.example/script.js |
| | b.example/redirect.php |
| | c.example/exploit.html |
| | c.example/malware.exe |
| | d.example/index.html |
| ... | ... |

FIG.6

CONTENTS OF NUMERICAL VECTOR

| DIMENSION | CONTENTS |
|---|---|
| 1 | NUMBER OF IP ADDRESSES CORRESPONDING TO DOMAINS WITH COMMON SECOND-LEVEL DOMAIN |
| 2 | NUMBER OF COUNTRIES CORRESPONDING TO DOMAINS WITH COMMON SECOND-LEVEL DOMAIN |
| 3 | AVERAGE OF LENGTHS OF DOMAINS FOR WHICH OPERATORS OF IP ADDRESSES ARE SAME |
| 4 | LENGTH OF URL |
| 5 | OCCURRENCE OF MALICIOUS PATTERN |
| 6 | OCCURRENCE OF PORT NUMBER |

FIG.10
COMBINATION OF NUMERICAL VECTORS USED
FOR INTEGRATION AND CREATION
FIRST LAYER
| 2 | -1 | 0 | 1 |
|---|----|---|---|
| 2 | -1 | 1 | 1 |
| 1 | -2 | -1 | 2 |
| -1 | 3 | 2 | 0 |
(a)
INTEGRATION
SECOND LAYER
(b)
CREATION
THIRD LAYER
(c)

| SIGN | COMMUNICATION DESTINATION | LIKELIHOOD OF BEING USED FOR ATTACH |
|---|---|---|
| ① | Example.com/index.html | YES |
| ○ | Example.com/image.jpg | NO |
| ② | mal1.com/script.js | YES |
| ③ | mal1.com/exploit.html | YES |

○ NUMERICAL VECTOR RELATED TO BENIGN COMMUNICATION DESTINATION
● NUMERICAL VECTOR RELATED TO MALICIOUS COMMUNICATION DESTINATION

CLASSIFICATION APPARATUS, CLASSIFICATION METHOD, AND CLASSIFICATION PROGRAM

CROSS-REFERENCE TO RELATED APPLICATIONS

The present application is based on PCT filing PCT/JP2017/028596, filed Aug. 7, 2017, and claims priority to 2016-196019, filed in the Japanese Patent Office on Oct. 3, 2016, the entire contents of each of which being incorporated herein by reference.

FIELD

The present invention relates to a classification apparatus, a classification method, and a classification program.

BACKGROUND

Drive-by download attacks that infect terminals with malware lead users who have accessed falsified famous sites to a certain URL in which an attack code is set, via a plurality of URLs by repeating redirections and transfers for acquiring contents. Then, after leading the users to the URL in which the attack code is set, the drive-by download attacks cause the users to install malware by exploiting vulnerabilities of browsers and plug-ins.

Conventionally, a decoy system called a honeyclient has been used to detect malicious sites. In the honeyclient, malicious sites are detected based on accesses to fraudulent processes and file systems (for example, see Non Patent Literature 1) or based on signatures and heuristics (for example, see Non Patent Literature 2). In other words, the purpose of the honeyclient is to analyze websites and detect malicious sites.

In addition, a number of techniques that focus on web contents and redirections have been studied as techniques that are applicable to detection of communication to malicious sites included in communication logs (for example, see Non Patent Literatures 3 and 4). Furthermore, a technique for effectively performing analysis using honeyclients by identifying a URL that serves as a source of redirection of contents used for attacks has been proposed (for example, see Non Patent Literature 5). In these techniques, it is necessary to analyze contents to identify malicious codes and identify redirect relationships.

Moreover, as a study that focuses on domains and URLs of malicious websites, a technique that focuses on a method of using IP addresses corresponding to domains (for example, see Non Patent Literature 6) and a technique that focuses on URLs used for fishing sites (for example, see Non Patent Literature 7) have been proposed. In these techniques, identification is performed on a single domain and a single URL.

CITATION LIST

Patent Literature

Non Patent Literature 1: M. Akiyama, M. Iwamura, Y. Kawakoya, K. Aoki, and M. Itoh, "Design and Implementation of High Interaction Client Honeypot for Drive-by-Download Attacks", IEICE transactions on communications, Vol. E93-B, pp. 1131-1139, 2010.
Non Patent Literature 2: J. Nazario, "PhoneyC: A Virtual Client Honeypot", LEET, 2009.
Non Patent Literature 3: C. Curtsinger, B. Livshits, B. Zorn, and C. Seifert, "ZOZZLE: Fast and Precise In-Browser JavaScript (registered trademark) Malware Detection", In Proceedings of the 20th USENIX Security Symposium, pp. 33-48, 2011.
Non Patent Literature 4: J. Zhang, C. Seifert, J. W. Stokes, and W. Lee, "Arrow: Generating Signatures to Detect Drive-By Downloads", In Proceedings of the 20th international conference on World wide web, pp. 187-196, 2011.
Non Patent Literature 5: T. Taylor, K. Z. Snow, N. Otterness, and F. Monrose, "Cache, Trigger, Impersonate: Enabling Context-Sensitive Honeyclient Analysis On-the-Wire", In Proceedings of the 23rd Annual Network and Distributed System Security Symposium, 2016.
Non Patent Literature 6: M. Antonakakis, R. Perdisci, D. Dagon, W. Lee, and N. Feamster, "Building a Dynamic Reputation System for DNS." In Proceedings of the 19th USENIX Security Symposium, 2010.
Non Patent Literature 7: J. Ma, L. K. Saul, S. Savage, and G. M. Voelker, "Beyond Blacklists: Learning to Detect Malicious Web Sites from Suspicious URLs", In Proceedings of the 15th ACM SIGKDD International Conference on Knowledge Discovery and Data Mining, pp. 1245-1253, 2009.

SUMMARY

Technical Problem

Conventionally, communication interception using blacklists of malicious URLs and malicious domains has been performed to prevent malware infection using malicious sites. Against this situation, attackers frequently change domains used for malicious sites or hide attack codes to avoid countermeasures using the blacklists.

Specifically, attackers hide the attack codes by providing attack codes to only users of browsers and plug-ins of certain types and versions that correspond to attack targets, without providing them to other users. As a result, it becomes difficult to detect malicious sites and add them to the blacklists before users access the malicious sites.

Therefore, countermeasures to detect terminals that are infected with malware from communication logs have attracted attention. Meanwhile, the method of detecting infected terminals from the communication logs is categorized into a method of detecting communication performed at the time of malware infection and a method of detecting communication caused by malware.

Here, a communication log that can be recorded in a large-scale network, such as a company, is sequential data on communication destinations, such as a proxy log. However, this log does not contain contents, and therefore, it is difficult to apply the technique that focuses on web contents and redirections for which contents analysis is needed. Further, while the technique of determining maliciousness with a focus on URLs and domains has been proposed, it may be difficult to accurately perform the determination because information obtained from a single URL and a single domain is scarce.

The present invention has been conceived in view of the foregoing situations, and an object is to provide a classification apparatus, a classification method, and a classification program capable of detecting an attack from a communication log with accuracy.

Solution to Problem

A classification apparatus includes: a numerical vector calculation unit configured to calculate numerical vectors that represent characteristics of communication destinations for each of the communication destinations, on the basis of sequential data in which the communication destinations in a plurality of communications are recorded in order of occurrence of the communications; and a classification unit configured to classify the sequential data into a class that has a similar feature, on the basis of order relation of the communication destinations of the numerical vectors.

Advantageous Effects of Invention

According to the present invention, it is possible to detect an attack from a communication log with accuracy.

BRIEF DESCRIPTION OF DRAWINGS

FIG. 1 is a schematic diagram illustrating an overall configuration of a classification apparatus according to an embodiment.

FIG. 2 is a diagram illustrating an example of a target communication log that is input to the classification apparatus illustrated in FIG. 1.

FIG. 3 is a diagram illustrating an example of a known communication log that is input to the classification apparatus illustrated in FIG. 1.

FIG. 4 is a diagram for explaining a process performed by a communication destination sequence extraction unit illustrated in FIG. 1.

FIG. 6 is a diagram illustrating contents of a numerical vector.

FIG. 10 is a diagram illustrating an example of integration and creation of numerical vectors, which are performed by the classification unit by using actual numerical values.

DESCRIPTION OF EMBODIMENTS

Figure 5:
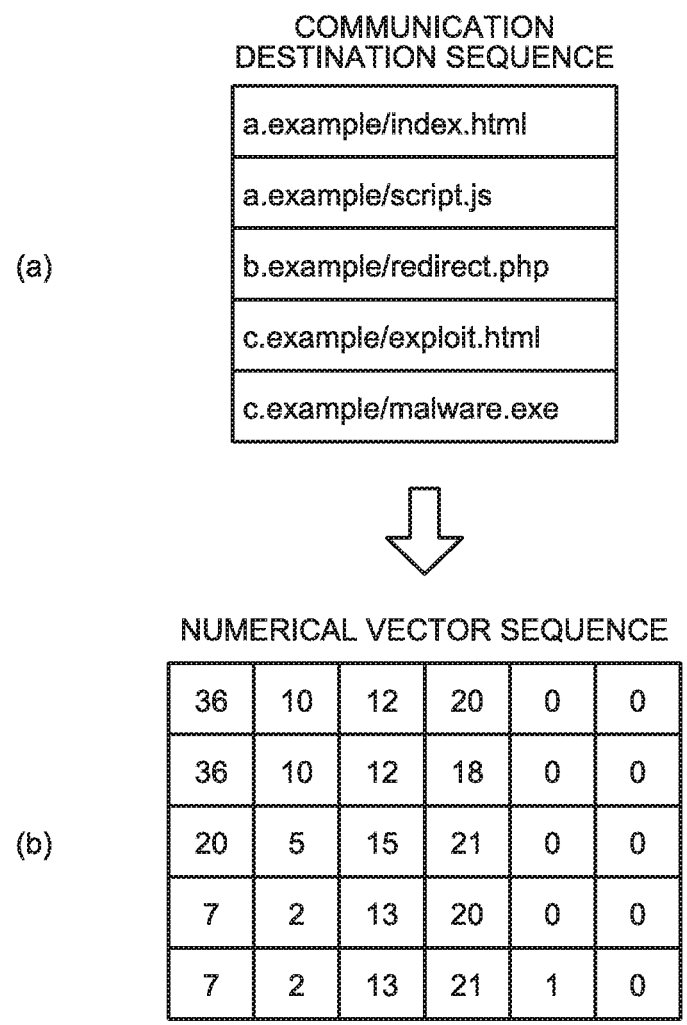
FIG. 5 is a diagram for explaining a process performed by a numerical vector calculation unit illustrated in FIG. 1.

One embodiment of the present invention will be described in detail below with reference to the drawings. The present invention is not limited by the embodiment below. In the description of the drawings, the same components are denoted by the same reference signs.

Embodiment

First, an overall configuration, flow of a classification process, and specific examples of a classification apparatus according to an embodiment will be described. A communication log of a terminal that is infected with malware by an attack contains a series of accesses to URLs that are related to the attack, in order of the accesses. Therefore, in the present embodiment, communication destination sequences are classified based on relationships among a plurality of communication destinations that are contained in sequential data on communication destinations in the communication log, and classification as to whether communication to a malicious site that performs a drive-by download attack is included is performed from the communication log.

FIG. 1 is a schematic diagram illustrating an overall configuration of the classification apparatus according to the embodiment. As illustrated in FIG. 1, a classification apparatus 1 according to the embodiment includes a target communication log input unit 11, a known communication log input unit 12, a communication destination sequence extraction unit 13, a numerical vector calculation unit 14, and a classification unit 15.

The target communication log input unit 11 accepts a classification target communication log as input. The communication log is a record of communication destinations and order relation of them. The known communication log input unit 12 accepts, as input, a known malicious communication log that is already known as malicious and a known benign communication log that is already known as benign.

The communication destination sequence extraction unit 13 extracts, from the communication log, communication destinations of a plurality of successive communications as sequential data used for classification. The sequential data is data in which communication destinations in a plurality of communications are recorded in order of occurrence of the communications.

The numerical vector calculation unit 14 calculates numerical vectors that represent characteristics of communication destinations for each of the communication destinations, on the basis of the sequential data.

The classification unit 15 classifies the sequential data into a class that has a similar feature, on the basis of the order relation of the communication destinations of the numerical vectors calculated by the numerical vector calculation unit 14. The classification unit 15 calculates new numerical vectors by integrating a plurality of numerical vectors in the sequential data on the basis of the numerical vectors calculated by the numerical vector calculation unit 14, and creates a small number of numerical vectors by calculating a new value for each of dimensions of the numerical vectors from the plurality of newly-calculated numerical vectors. The numerical vectors that are created after repeating integrations and creations of the numerical vectors multiple times are classified into either benign or malicious by using a machine learning method, such as a decision tree, a support vector machine, or a neural network. The machine learning method is not limited to the above-described examples.

[Example of Input of a Classification Target Communication Log]

FIG. 2 is a diagram illustrating an example of a target communication log input to the classification apparatus 1 illustrated in FIG. 1. As illustrated in FIG. 2, the communication log as an identification target contains a serial number and information on communication destinations. As for the serial number, the same number is assigned to communication destinations that are contained in the same communication log. Further, the information on the communication destinations may be a URL, but it is not limited thereto, and a FQDN, a domain, a host name, or the like may be adopted. The communication log may contain a time at which communication has occurred, information on transmission sources, or the like. It is necessary to record the information on the communication destinations in order of occurrence of accesses or it is necessary to add information indicating the order to the information, on the communications destinations.

[Example of Input of a Known Malicious]Communication Log and a Known Benign Communication Log FIG. 3 is a diagram illustrating an example of a known communication log input to the classification apparatus 1 illustrated in FIG. 1. The known communication log contains a serial number, a label, and information on communication destinations. As for the serial number, the same number is assigned to communication destinations that are contained in the same communication log. Further, the information on the communication destinations may be a URL, but it is not limited thereto, and a FQDN, a domain, a host name, or the like may be adopted. The label is not limited to "benign" and "malicious" as illustrated in FIG. 3, but may be "advertising", "Drive-by-download", "phishing", or the like. The communication log may contain a time at which communication has occurred, information on transmission sources, or the like. It is necessary to record the information on the communication destinations in order of occurrence of accesses or it is necessary to add information indicating the order to the information, on the communications destinations.

[Process Performed by the Communication]Destination Sequence Extraction Unit

Next, a process performed by the communication destination sequence extraction unit 13 will be described. FIG. 4 is a diagram for explaining a process performed by the communication destination sequence extraction unit 13 illustrated in FIG. 1. The communication destination sequence extraction unit 13 extracts a plurality of communication destinations from among communication destinations that are contained in the same serial number in the communication log (see FIG. 4(a)), and creates a communication destination sequence (see FIG. 4(b)). At this time, the communication destination sequence extraction unit 13 may extract the communication destinations without any change, or may extract only a part of the communication destinations. However, the communication destination sequence extraction unit 13 needs to extract the communication destinations in the same format.

For example, the communication destination sequence extraction unit 13 extracts five communication destinations from among the communication destinations that are contained in the serial number "1" (see FIG. 4(a)) in order of occurrence of communications (see FIG. 4(b)). Specifically, the communication destination sequence extraction unit 13 extracts, from among the communication destinations that are contained in the serial number "1" (see FIG. 4(a)), five communication destinations of "a.example/index.html" to "c.example/malware.exe" in the first row to the fifth row (see FIG. 4(b)). At this time, the communication destination sequence extraction unit 13 newly assigns a serial number to the extracted communication destination sequence to prevent redundancy. For example, the communication destination sequence extraction unit 13 re-assigns the serial number "1" to the extracted five communication destinations "a.example/index.html" to "c.example/malware.exe" (see FIG. 4(b)).

Subsequently, the communication destination sequence extraction unit 13 extracts, from among the communication destinations that are contained in the serial number "1" (see FIG. 4(a)), five communication destinations of "a.example/script.js" to "d.example/index.html" in the second row to the sixth row (see FIG. 4(b)). Then, the communication destination sequence extraction unit 13 re-assigns the serial number "2" to the extracted communication destinations "a.example/script.js" to "d.example/index.html" (see FIG. 4(b)).

Further, if the communication log contains time information, the communication destination sequence extraction unit 13 is able to extract communications that have occurred in a predetermined time or estimate and extract highly-correlated communication destinations based on communication occurrence intervals. Furthermore, if the communication log contains transmission sources, the communication destination sequence extraction unit 13 is able to extract only communication destinations that correspond to the same transmission sources. Through the methods as described above, in the classification apparatus 1, the communication destination sequence contains communication destinations of communications that have occurred due to an access to a single website, so that it is possible to easily perform classification and improve classification accuracy. Meanwhile, if a label is assigned to the communication log, the communication destination sequence extraction unit 13 also assigns the same label to the communication destination sequence.

[Process Performed by the Numerical Vector Calculation Unit]

Next, a process performed by the numerical vector calculation unit 14 will be described. FIG. 5 is a diagram for explaining a process performed by the numerical vector calculation unit 14 illustrated in FIG. 1. FIG. 6 is a diagram illustrating contents of the numerical vector.

For example, the numerical vector calculation unit 14 calculates a numerical vector for each of the communication destinations from the sequential data of the communication destinations, with respect to the sequential data of the communication destinations illustrated in FIG. 5(a), and outputs sequential data of the numerical vectors (for example, see FIG. 5(b)). The contents of the numerical vectors include, as illustrated in FIG. 6, the "number of IP addresses corresponding to domains with a common second-level domain", the "number of countries corresponding to domains with a common second-level domain", an "average of the lengths of domains for which operators of the IP addresses are the same", the "length of a URL", "occurrence of a malicious pattern", and "occurrence of a port number". The contents of the numerical vectors are, of course, not limited to the contents illustrated in FIG. 6, and may include, for example, "described in a blacklist", "occurrence of an IP address", or the like.

[Process Performed by the Classification Unit]

Figure 7:
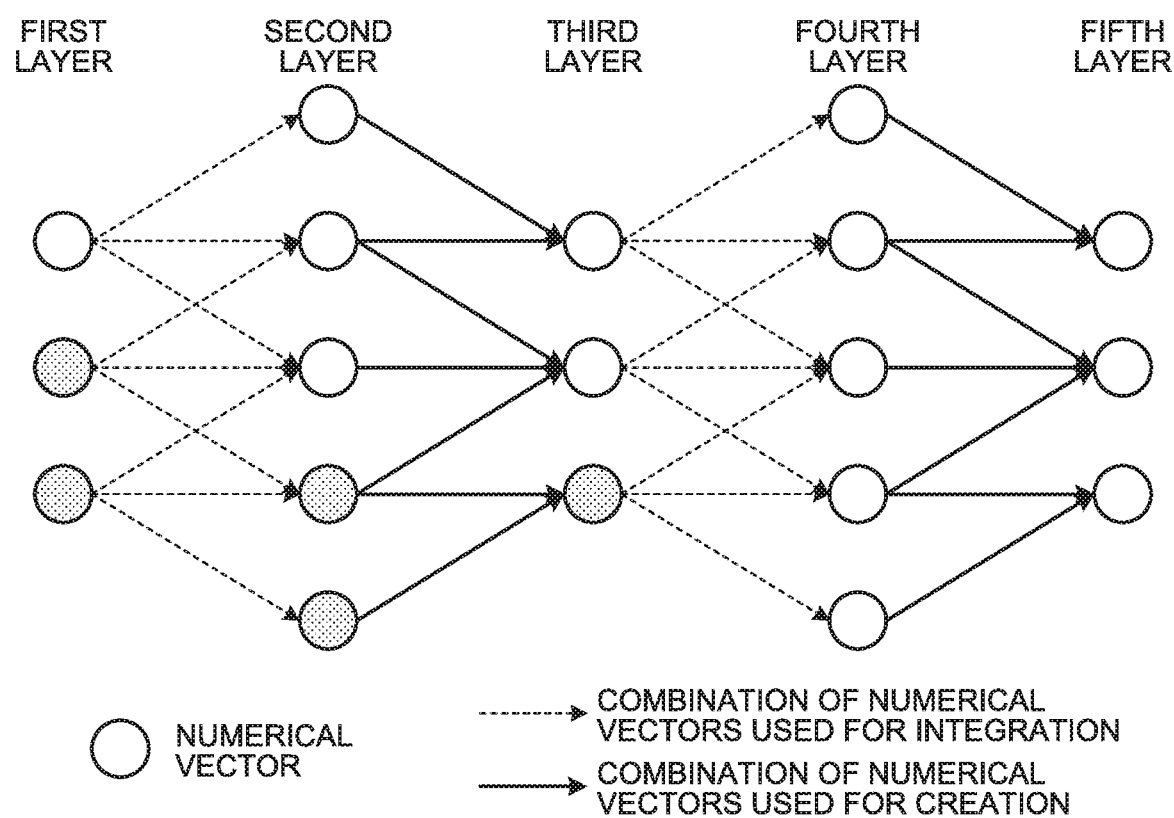
FIG. 7 is a diagram illustrating an example of how to integrate and create numerical vectors by the classification unit illustrated in FIG. 1.
Figure 8:
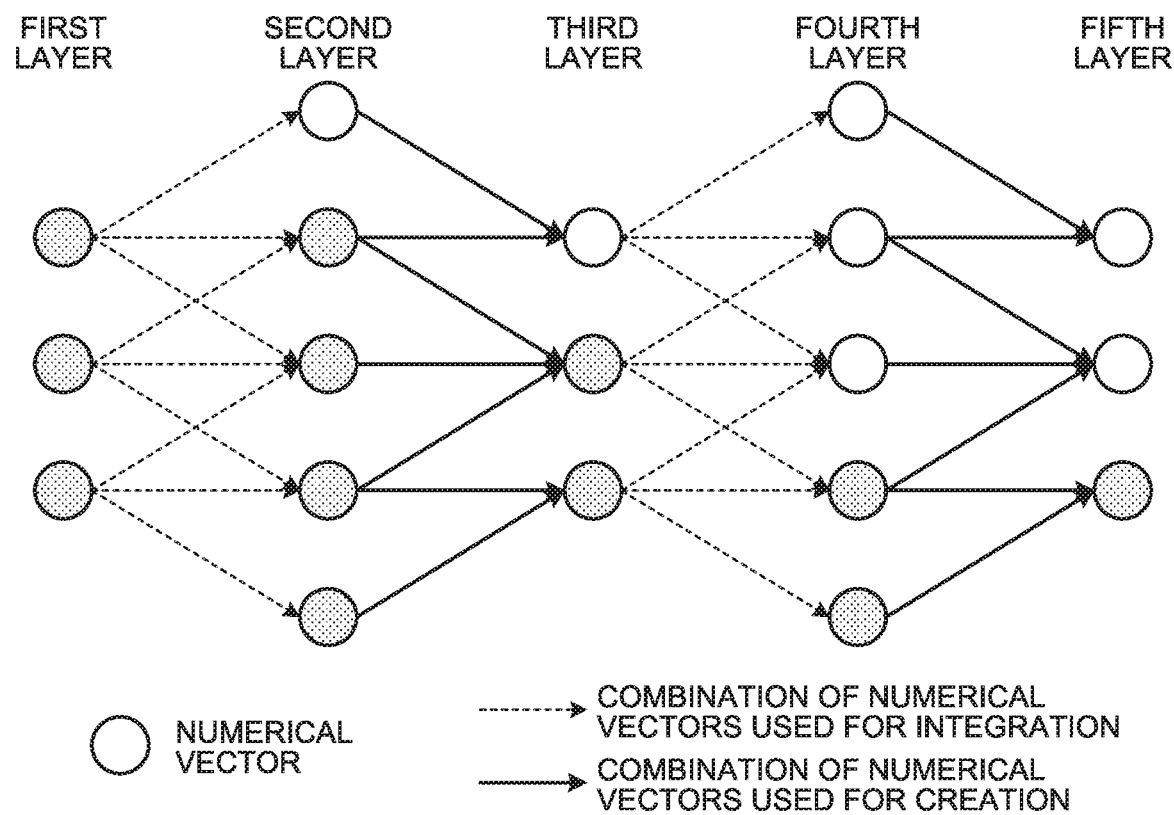
FIG. 8 is a diagram illustrating an example of how to integrate and create numerical vectors by the classification unit illustrated in FIG. 1.

FIG. 7 and FIG. 8 are diagrams illustrating examples of how to integrate and create numerical vectors by the classification unit 15 illustrated in FIG. 1. In FIG. 7, numerical vectors corresponding to the first layer to the fifth layer are represented by circles, arrows indicating combination of numerical vectors that are used for integration are represented by dashed lines, and arrows indicating combination with numerical vectors that are used for creation are represented by solid lines.

In the example in FIG. 7, the classification unit 15 calculates, in the second layer and the fourth layer, new numerical vectors by integrating a plurality of numerical vectors that are present in the previous layers. The classification unit 15 calculates a value of each of dimensions of the new numerical vectors by using values of all or a part of the numerical vectors that are used for integration. Meanwhile, the number of dimensions of the new numerical vectors may be different from that of the numerical vectors that are present before integration. However, the number of dimensions of the new numerical vectors needs to be the same in each integration.

Then, in the third layer and the fifth layer in FIG. 7, the classification unit 15 creates a small number of numerical vectors. Meanwhile, the dimensions of the created numerical vectors need to be the same as the dimensions of the numerical vectors that are present in the previous layer. When creating the numerical vectors, the classification unit 15 creates the new numerical vectors by using the numerical vectors that are present in the previous layer of the layer in which combination is performed, and calculating a maximum value, a minimum value, an average, or the like in each of the dimensions.

As illustrated in FIG. 7, the classification unit 15 repeats integration and creation of the numerical vectors. The classification unit 15 is able to gradually extract information on the entire sequential data from local information by repeating integration and creation of numerical vectors. In other words, the classification unit 15 is able to calculate the numerical vectors that represent characteristics of the entire sequential data by taking into account local characteristics of the sequential data.

Specifically, it can be seen that the bottommost numerical vector in the third layer in FIG. 7 is calculated based on the value of each of the numerical vectors that are represented by hatching by tracing back the combination. In other words, the classification unit 15 extracts local information on the central numerical vector in the first layer and the bottommost numerical vector in the first layer by creating the bottommost numerical vector in the third layer.

Similarly, the bottommost numerical vector in the fifth layer is calculated based on the values of the numerical vectors that are represented by hatching in FIG. 8. In other words, the classification unit 15 extracts information on the entire series by creating the bottommost numerical vector in the fifth layer.

Figure 9:
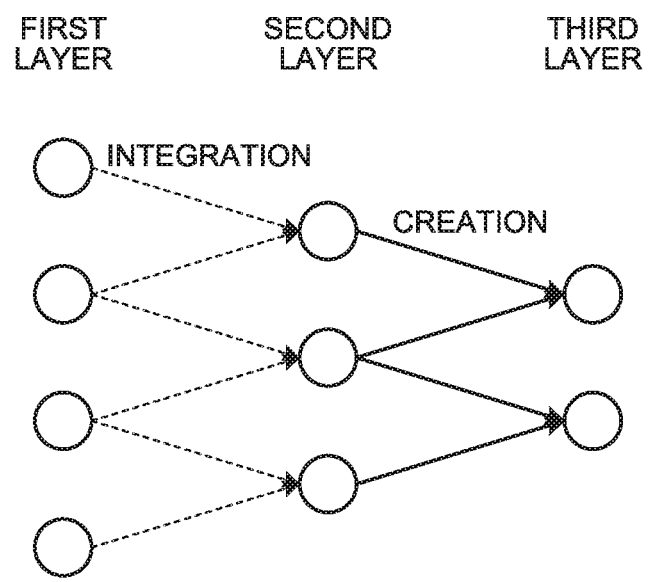
FIG. 9 is a diagram illustrating an example of integration and creation of numerical vectors, which are performed by the classification unit in accordance with a first layer to a third layer.

The process performed by the classification unit 15 will be described in detail below with reference to FIG. 9 and FIG. 10. FIG. 9 is a diagram illustrating an example of integration and creation of numerical vectors, which are performed by the classification unit 15 in accordance with the first layer to the third layer. FIG. 10 is a diagram illustrating an example of integration and creation of numerical vectors, which are performed by the classification unit 15 by using actual numerical values.

For example, as illustrated in FIG. 9, the classification unit 15 performs an integration process on the first layer and the second layer. This case will be described. In this case, the classification unit 15 calculates, as the integration process, each of dimensions of new numerical vectors by using values of all of the dimensions of the adjacent two numerical vectors, on the basis of Equations (1) and (2) below.

calculation formula for integration $$y_{a,1} = \sum_i (x_{a,i} + x_{a+1,i}) \tag{1}$$

$$y_{a,2} = \sum_i x_{a,i} x_{a+1,i} \tag{2}$$

($x_{a,i}$: value of a-th row and i-th column of numerical vector used for integration, $y_{a,i}$: value of a-th row and i-th column of integrated numerical vector)

The classification unit 15 calculates, as the numerical vectors in the second layer, newly-calculated numerical vectors by performing the integration process on a plurality of numerical vectors that are present in the sequential data indicated in the first layer. Specifically, the classification unit 15 performs the integration process using Equations (1) and (2) on each of the values indicated in a matrix in FIG. 10(a). The classification unit 15 obtains the numerical vectors in the second layer on the basis of each of the values that are newly calculated through the integration process as illustrated in a matrix in FIG. 10(b), for example.

Then, as illustrated in FIG. 9, the classification unit 15 performs a creation process in the second layer and the third layer. The classification unit 15 outputs, as the creation process in the second layer and the third layer, a maximum value in each of the dimensions of the adjacent two numerical vectors. For example, the classification unit 15 calculates the maximum value in each of the dimensions of the adjacent two numerical vectors by using Equation (3) below.

calculation formula for creation $$y_{a,i} = \max(x_{a,i}, x_{a+1,1}) \tag{3}$$

($x_{a,i}$: value of a-th row and i-th column of numerical vector used for creation, $y_{a,i}$: value of a-th row and i-th column of created numerical vector)

The classification unit 15 obtains the numerical vectors in the third layer using the maximum values (for example, see a matrix in FIG. 10(c)) that are output based on the values in the second layer represented by the matrix in FIG. 10(b) through the above-described process.

Figure 11A:
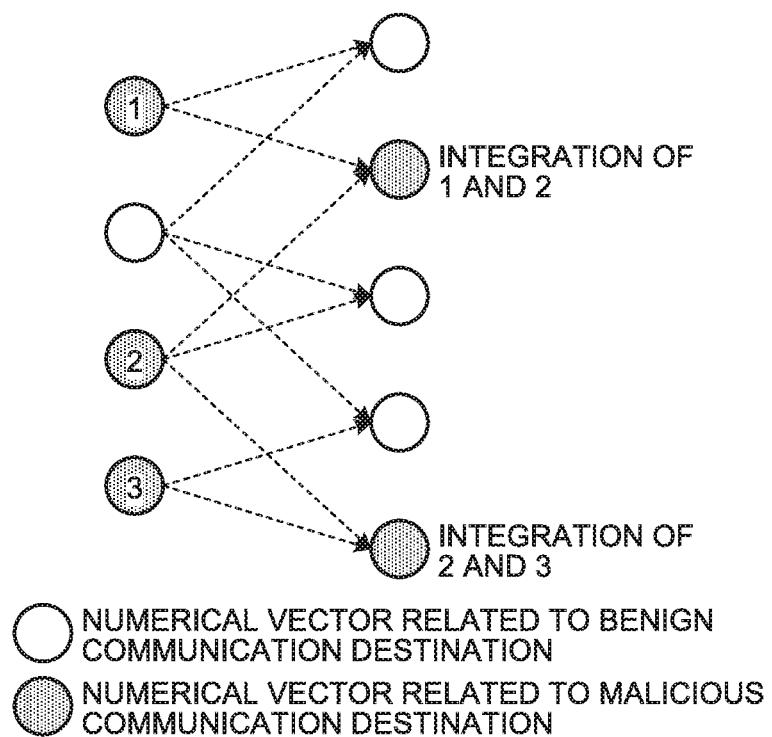
FIG. 11A is a diagram illustrating an example of integration of new numerical vectors from two numerical vectors among a plurality of numerical vectors included in a predetermined range.
Figure 11B:
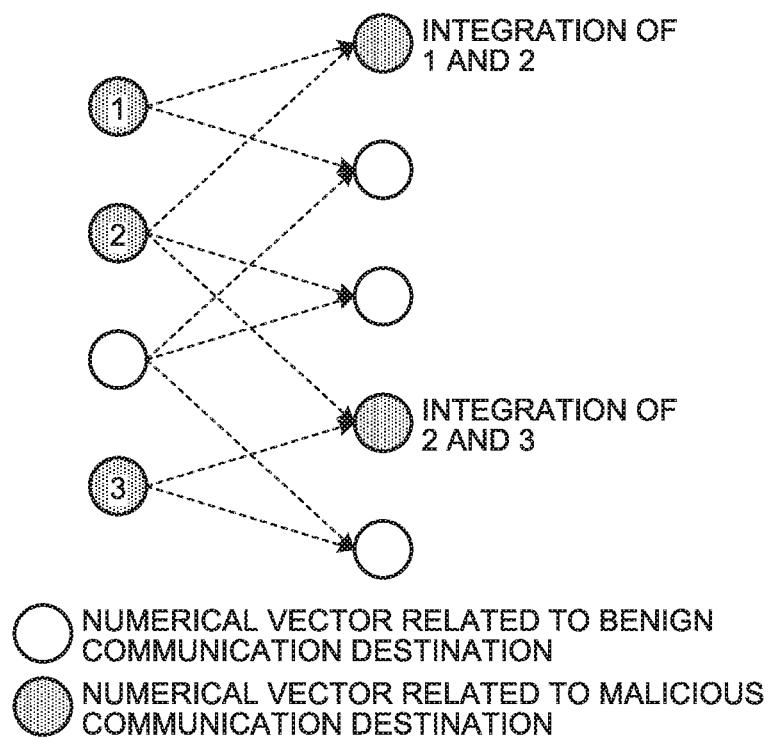
FIG. 11B is a diagram illustrating an example of integration of new numerical vectors from two numerical vectors among a plurality of numerical vectors included in a predetermined range.

FIG. 11A and FIG. 11B are diagrams illustrating examples of integration of new numerical vectors from two numerical vectors among a plurality of numerical vectors that are included in a predetermined range. As illustrated in FIG. 11A and FIG. 11B, the classification unit 15 selects two numerical vectors from among n successive numerical vectors and integrates them to calculate new numerical vectors. Meanwhile, the value of each of dimensions of the new numerical vectors is calculated by using values of all or a part of the numerical vectors that are used for integration. Further, the number of the dimensions of the new numerical vectors may be different from that of the numerical vectors that are present before integration. However, the number of dimensions of the new numerical vectors needs to be the same in each integration.

Even when benign communication destinations that are not related to an attack are mixed, if communication destinations that are related to an attack are present in n successive communication destinations, the classification unit 15 is able to integrate only numerical vectors of the communication destinations that are related to an attack by performing integration of the two numerical vectors. Specifically, among the numerical vectors illustrated in FIG. 11A and FIG. 11B, numerical vectors corresponding to black circles are related to malicious communication destinations, and numerical vectors corresponding to white circles are related to benign communication destinations. Further, a case will be described in which, in the layer before integration (on the left side), positions of a numerical vector that is related to a benign communication destination (white circle) and a numerical vector that is related to the second malicious communication destination (a black circle 2) are interchanged in a vertical direction as illustrated in FIG. 11A and FIG. 11B.

In each of the cases illustrated in FIG. 11A and FIG. 11B, as indicated in a layer subjected to integration (on the right side), the classification unit 15 performs integration of the numerical vectors that are related to only the first and second malicious communication destinations and integration of the numerical vectors that are related to only the second and third malicious communication destinations. Therefore, if communication destinations that are related to an attack are present in the n successive communication destinations, the classification unit 15 is able to integrate only the numerical vectors of the communication destinations that are related to an attack.

Here, when selecting two numerical vectors from among n communication destinations, the classification unit 15 may select all of combinations or select only some of the combinations.

Figures 12, 13:
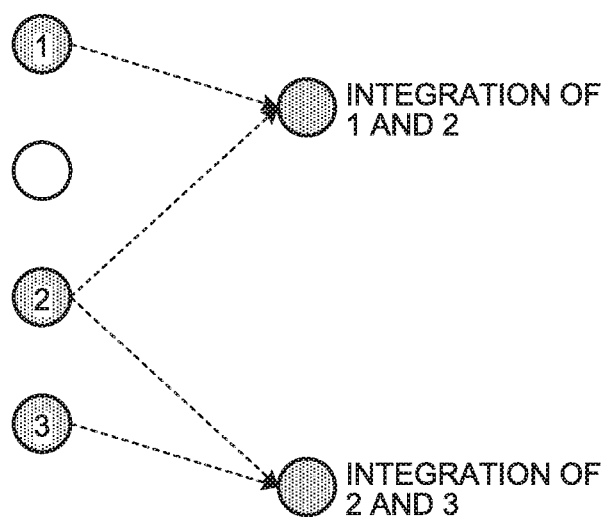
FIG. 12 is a diagram illustrating correspondence among the number of each of the numerical vectors, a sign indicating malicious or benign, a communication destination of each of the numerical vectors, and a likelihood of being used for an attack.
FIG. 13 is a diagram illustrating an example of integration of new numerical vectors from two numerical vectors among a plurality of numerical vectors that are included in a predetermined range.

Further, when integrating the numerical vectors, the classification unit 15 may select two communication destinations or the like having different domains in files that are likely to be used for an attack, to thereby be able to select only numerical vectors that may be highly related to an attack and reduce influence of the communication destinations that are not related to an attack. FIG. 12 is a diagram illustrating correspondence among the number of each of the numerical vectors, a sign indicating malicious or benign, a communication destination of each of the numerical vectors, and a likelihood of being used for an attack. FIG. 13 is a diagram illustrating an example of integration of new numerical vectors from two numerical vectors among a plurality of numerical vectors that are included in a predetermined range.

In this case, the classification unit 15 selects two communication destinations that are likely to be used for an attack and that have different domains. Specifically, the classification unit 15 performs integration from only malicious communication destinations (the black circle 1 and the black circle 2 in FIG. 12 or the black circle 2 and the black circle 3 in FIG. 12) (see FIG. 13), and does not perform integration for the other communication destinations.

As a result, the classification unit 15 repeats integration of only the malicious communication destinations and creation of a small number of numerical vectors a plurality of times, and thereafter, classifies the created numerical vectors by a machine learning method. In other words, the classification unit 15 is able to input, to the machine learning method, numerical vectors from which influence of communication destinations that are not related to an attack is removed, with respect to an identification target communication log that contains malicious communication destinations. Therefore, the classification unit 15 is able to perform classification of the identification target communication log that contains malicious communication destinations, on the basis of order relation of the malicious communication destinations without influence of benign communication destinations, and therefore, it is possible to improve the classification accuracy.

[Flow of the Classification Model Creation Process]

Figure 14:
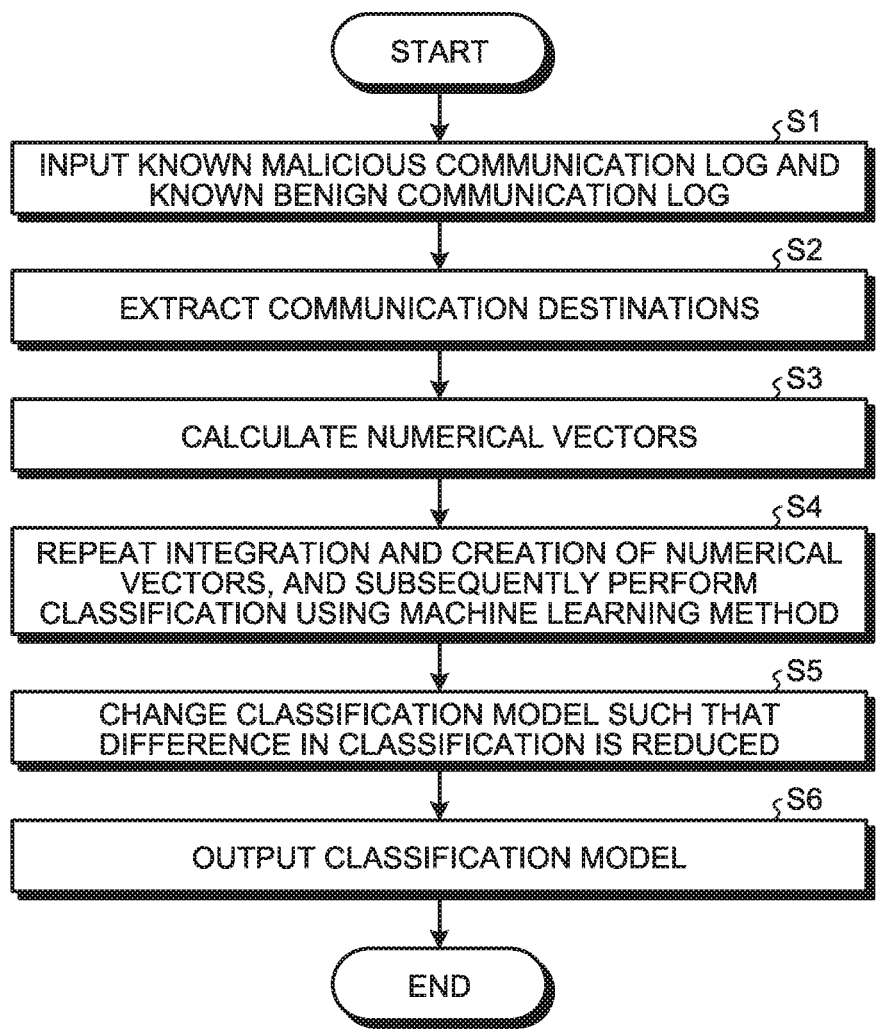
FIG. 14 is a flowchart illustrating the flow of a classification model creation process according to the embodiment.
Figure 15:
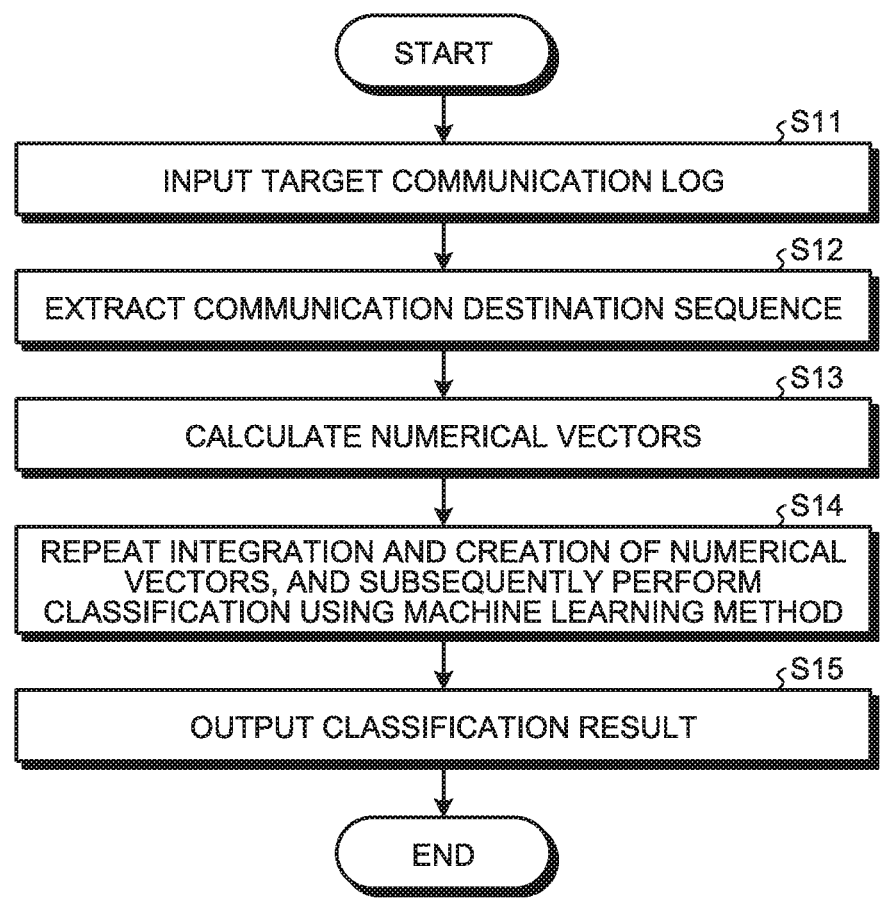
FIG. 15 is a flowchart illustrating the flow of a classification process using a classification model according to the embodiment.

Next, operation of the classification apparatus 1 will be described in detail with reference to FIG. 14 and FIG. 15. A process of creating a classification model that is used by the classification unit 15 for classification will be described. The classification model is for outputting an identification result (identification of benign, identification of malicious, or the like) upon input of input data (numerical vectors of each sequential data). FIG. 14 is a flowchart illustrating the flow of the classification model creation process according to the embodiment.

First, in the classification apparatus 1, the known communication log input unit 12 accepts input of the known malicious communication log and the known benign communication log (Step S1), the communication destination sequence extraction unit 13 performs a communication destination extraction process of extracting, as sequential data used for classification, communication destinations of a plurality of successive communications from the input communication log (Step S2). The communication destination sequence extraction unit 13 performs the communication destination extraction process by performing the process that has been described with reference to FIG. 4.

Then, the numerical vector calculation unit 14 performs a numerical vector calculation process of calculating numerical vectors that represent characteristics of the communication destinations for each of the communication destinations, on the basis of the sequential data (Step S3). The numerical vector calculation unit 14 performs the numerical vector calculation process by performing the process that has been described with reference to FIG. 5 and FIG. 6.

Thereafter, the classification unit 15 repeats integration and creation of a plurality of numerical vectors in the sequential data, and subsequently perform classification using a machine learning method (Step S4). The machine learning method is for inputting numerical vectors that are obtained through repetition of the integration and the creation and outputting a classification result. At Step S4, the classification unit 15 performs the integration and the creation of the numerical vectors by performing the process that has been described with reference to FIG. 7 to FIG. 13. Then, the classification unit 15 calculates a classification result using the numerical vectors in which the entire sequential data is integrated. Subsequently, the classification unit 15 changes the classification model, i.e., the way of integration and parameters of the machine learning method, such that a difference between the classification result and the label is reduced (Step S5). The classification unit 15 repeats this process adequately. In other words, the classification unit 15 calculates new numerical vectors by integrating a plurality of numerical vectors in the sequential data, and calculates a new value for each of dimensions of the numerical vectors from the plurality of newly-calculated numerical vectors, to thereby create a small number of numerical vectors. Then, the classification unit 15 outputs, as the classification model, the way of integration, arithmetic expressions, and parameters of the machine learning method, with which a difference between the classification result and the label is reduced (Step S6).

[Flow of the Classification Process]

Next, the classification process performed by the classification apparatus 1 will be described with reference to FIG.

15. FIG. 15 is a flowchart illustrating the flow of the classification process using the classification model according to the embodiment.

First, in the classification apparatus 1, the target communication log input unit 11 accepts input of a target communication log that is a classification target (Step S11), and the communication destination sequence extraction unit 13 performs the communication destination extraction process of extracting, as sequential data used for classification, communication destinations of a plurality of successive communications from the input communication log (Step S12). The communication destination sequence extraction unit 13 performs the communication destination extraction process by performing the process that has been described with reference to FIG. 4.

Then, the numerical vector calculation unit 14 performs the numerical vector calculation process of calculating numerical vectors that represent characteristics of the communication destinations for each of the communication destinations, on the basis of the sequential data (Step S13). The numerical vector calculation unit 14 performs the numerical vector calculation process by performing the process that has been described with reference to FIG. 5 and FIG. 6.

Thereafter, the classification unit 15 repeats integration and creation of a plurality of numerical vectors in the sequential data corresponding to the target communication log, finally inputs the numerical vectors in which the entire sequential data is integrated to the machine learning method, and performs classification of the target communication log (Step S14). In other words, the classification unit 15 classifies the sequential data corresponding to the target communication log to a class (benign or malicious) that has a similar feature, on the basis of the order relation of the communication destinations of the numerical vectors. Then, the classification unit 15 outputs a classification result of the target communication log, i.e., an identification result of the target communication log (identification of benign, identification of malicious, or the like) (Step S15).

[Effects of the Embodiment]

A communication log of a terminal that is infected with malware by a drive-by download attack contains a series of accesses to URLs that are related to the attack, in order of the accesses. In the present embodiment, numerical vectors that represent characteristics of communication destinations are calculated for each of the communication destinations on the basis of sequential data in which communication destinations in a plurality of communications are recorded in order of occurrence of the communications, and the sequential data is classified into a class that has a similar feature on the basis of the order relation of the communication destinations of the numerical vectors. Therefore, by applying the present embodiment, it is possible to perform classification as to whether communication that is performed when infection with malware due to the drive-by download attack has occurred is contained, from the sequential data of the communication destinations contained in the communication log. Consequently, according to the present embodiment, by detecting communication performed at the time of malware infection, it is possible to detect an attack with high accuracy from the communication log before damage due to the malware occurs.

Furthermore, in the present embodiment, the order relation of accesses to a plurality of URLs that are related to the drive-by download attack and that are contained in the sequential data of the communication destinations is focused on, and a feature of malicious redirections that occur in the drive-by download attack is recognized to thereby improve the analysis accuracy. In other words, in the present embodiment, classification is performed by taking into account a relation and characteristics of a plurality of communication destinations, instead of a single communication destination, and thus, it is possible to obtain adequate information from the plurality of communication destinations. Therefore, according to the present embodiment, it is possible to improve the classification accuracy as compared to the conventional method in which information is obtained from a single communication destination. In reality, it was confirmed that the classification accuracy was improved in the experiment to which the present embodiment was applied.

Moreover, in the present embodiment, the communication destination sequence extraction unit 13 extracts communication destinations of a plurality of successive communications as sequential data from a log in which the communication destinations and order relation of them are recorded; therefore, contents analysis is not needed. Therefore, the present embodiment is applicable even to a communication log which is recorded in a large-scale network and in which contents are not recorded.

Furthermore, in the present embodiment, the classification unit 15 repeats calculation of new numerical vectors by integrating a plurality of numerical vectors in the sequential data and creation of a small number of numerical vectors by newly calculating a value of each of dimensions of the numerical vectors from the plurality of newly-calculated numerical vectors. Therefore, according to the present embodiment, it is possible to calculate the numerical vectors that represent characteristics of the entire sequential data by taking into account local characteristics of the sequential data.

Moreover, when calculating new numerical vectors from a plurality of numerical vectors, the classification unit 15 calculates the new numerical vectors by integrating two numerical vectors from among a plurality of numerical vectors that are included in a predetermined range of the sequential data. Therefore, in the present embodiment, even when a communication destination that is not related to an attack is mixed, it is possible to reliably integrate the numerical vectors of the communication destinations that are related to an attack, so that it is possible to improve the classification accuracy.

Other Embodiments

[System Configuration Etc.]

The components of the apparatuses illustrated in the drawings are conceptual function, and need not be physically configured in the manner illustrated in the drawings. In other words, specific forms of distribution and integration of the apparatuses are not limited to those illustrated in the drawings, and all or a part of the apparatuses may be functionally or physically distributed or integrated in arbitrary units depending on various loads or use conditions Further, all or an arbitrary part of the processing functions implemented by the apparatuses may be realized by a CPU and a program analyzed and executed by the CPU, or may be realized by hardware using wired logic.

In addition, of the processes described in the embodiments, all or a part of a process described as being performed automatically may also be performed manually. Alternatively, all or a part of a process described as being performed manually may also be performed automatically by known methods. Further, the processing procedures, control procedures, specific names, and information including various kinds of data and parameters illustrated in the above-described document and drawings may be arbitrarily changed unless otherwise specified.

Program

Figure 16:
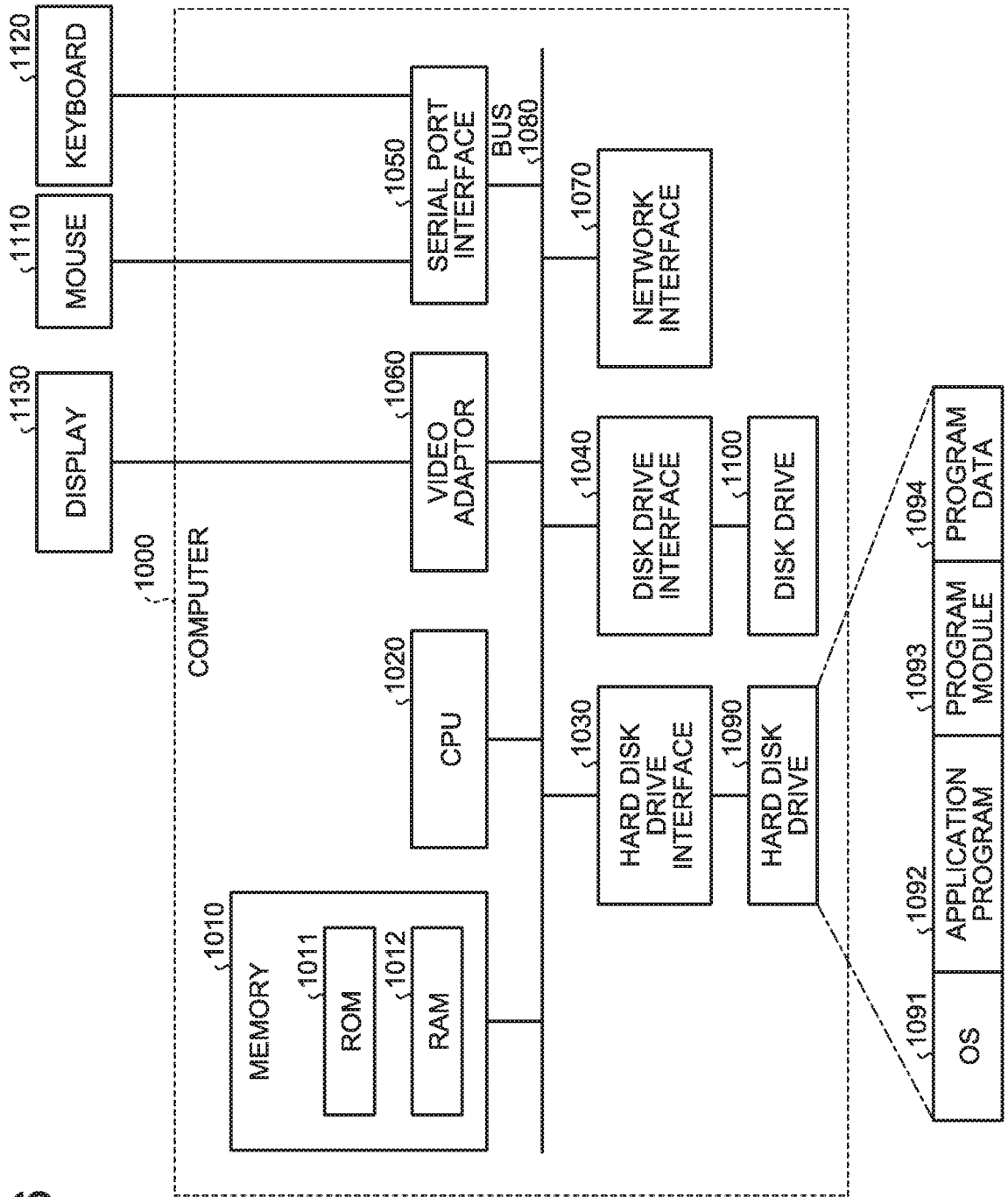
FIG. 16 is a diagram illustrating an example of a computer that realizes the classification apparatus by execution of a program.

FIG. 16 is a diagram illustrating an example of a computer that realizes the classification apparatus 1 by executing a program. A computer 1000 includes, for example, a memory 1010 and a CPU 1020. Further, the computer 1000 includes a hard disk drive interface 1030, a disk drive interface 1040, a serial port interface 1050, a video adaptor 1060, and a network interface 1070. All of the above-described units are connected to one another via a bus 1080.

The memory 1010 includes a read only memory (ROM) 1011 and a RAM 1012. The ROM 1011 stores therein, for example, a boot program, such as a basic input output system (BIOS). The hard disk drive interface 1030 is connected to a hard disk drive 1090. The disk drive interface 1040 is connected to a disk drive 1100. For example, a removable storage medium, such as a magnetic disk or an optical disk, is inserted into the disk drive 1100. The serial port interface 1050 is connected to, for example, a mouse 1110 and a keyboard 1120. The video adaptor 1060 is connected to, for example, a display 1130.

The hard disk drive 1090 stores therein, for example, an OS 1091, an application program 1092, a program module 1093, and program data 1094. In other words, the program that defines each of the processes performed by the classification apparatus 1 is implemented as the program module 1093 in which codes that are executable by the computer 1000 are written. The program module 1093 is stored in, for example, the hard disk drive 1090. For example, the program module 1093 for implementing the same processes as the functional configuration of the classification apparatus 1 are stored in the hard disk drive 1090. The hard disk drive 1090 may be replaced with a solid state drive (SSD).

Further, setting data used in the processes of the embodiment as described above is stored, as the program data 1094, in the memory 1010 or the hard disk drive 1090, for example. Then, the CPU 1020 loads the program module 1093 and the program data 1094 stored in the memory 1010 or the hard disk drive 1090 onto the RAM 1012, and executes them if needed.

The program module 1093 and the program data 1094 need not always be stored in the hard disk drive 1090, but may be stored in, for example, a removable storage medium and may be read by the CPU 1020 via the disk drive 1100 or the like. Alternatively, the program module 1093 and the program data 1094 may be stored in a different computer that is connected via a network (LAN, WAN, or the like). Then, the program module 1093 and the program data 1094 may be read by the CPU 1020 from the different computer via the network interface 1070.

The embodiments to which the invention devised by the present inventors is applied have been described above. Nevertheless, the present invention is not limited by the description and the drawings that constitute part of the disclosure of the present invention according to the present embodiments. In other words, other embodiments, examples, operational technologies, and the like that are conceived by those skilled in the art based on the present embodiments are all included in the scope of the present invention.

REFERENCE SIGNS LIST

1 CLASSIFICATION APPARATUS
11 TARGET COMMUNICATION LOG INPUT UNIT
12 KNOWN COMMUNICATION LOG INPUT UNIT
13 COMMUNICATION DESTINATION SEQUENCE EXTRACTION UNIT
14 NUMERICAL VECTOR CALCULATION UNIT
15 CLASSIFICATION UNIT

The invention claimed is:

1. A classification apparatus comprising:
a memory; and
a processor coupled to the memory and programmed to execute a process comprising:
calculating numerical vectors that represent characteristics of communication destinations for each of the communication destinations, on the basis of sequential data in which the communication destinations in a plurality of communications are recorded in order of occurrence of the communications; and
classifying the sequential data into a class that has a similar feature, on the basis of order relation of the communication destinations of the numerical vectors,
wherein the classifying includes classifying after combining a plurality of the calculated numerical vectors and obtaining a small number of new numerical vectors.

2. The classification apparatus according to claim 1, wherein the processor is further programmed to execute:
extracting, as the sequential data, the communication destinations of a plurality of successive communications from a log in which the communication destinations and order relation of the communication destinations are recorded.

3. The classification apparatus according to claim 1, wherein the classifying repeats calculation of new numerical vectors by integrating the plurality of numerical vectors in the sequential data and creation of the small number of numerical vectors by calculating a new value for each of dimensions of the numerical vectors from the plurality of newly-calculated numerical vectors.

4. The classification apparatus according to claim 3, wherein the classifying selects two numerical vectors from among a plurality of numerical vectors that are included in a predetermined range of the sequential data, and calculates a new numerical vector by integrating the selected two numerical vectors.

5. A classification method implemented by a classification apparatus that classifies sequential data into a class that has a similar feature, the sequential data being data in which input communication destinations in a plurality of communications are recorded in order of occurrence of the communications, the classification method comprising:
a numerical vector calculation step of calculating numerical vectors that represent characteristics of the communication destinations for each of the communication destinations, on the basis of the sequential data; and
a classification step of classifying the sequential data into a class that has a similar feature, on the basis of order relation of the communication destinations of the numerical vectors,
wherein the classification step includes classifying after combining a plurality of the calculated numerical vectors and obtaining a small number of new numerical vectors.

6. A non-transitory computer-readable recording medium having stored therein a classification program for causing a computer to execute a process comprising:
a numerical vector calculation step of calculating numerical vectors that represent characteristics of the communication destinations for each of the communication destinations, on the basis of sequential data in which input communication destinations in a plurality of communications are recorded in order of occurrence of the communications; and a classification step of classifying the sequential data into a class that has a similar feature, on the basis of order relation of the communication destinations of the numerical vectors, wherein the classification step includes classifying after combining a plurality of the calculated numerical vectors and obtaining a small number of new numerical vectors.

* * * * *